United States Patent
Sugiyama et al.

(10) Patent No.: US 7,852,489 B2
(45) Date of Patent: Dec. 14, 2010

(54) METHOD FOR MEASURING SURFACE PROFILE, AND APPARATUS USING THE SAME

(75) Inventors: Masashi Sugiyama, Tokyo (JP); Hidemitsu Ogawa, Otsu (JP); Katsuichi Kitagawa, Otsu (JP); Kazuyoshi Suzuki, Otsu (JP)

(73) Assignees: Tokyo Institute of Technology, Tokyo (JP); Toray Engineering Co., Ltd., Tokyo (JP)

( * ) Notice: Subject to any disclaimer, the term of this patent is extended or adjusted under 35 U.S.C. 154(b) by 283 days.

(21) Appl. No.: 12/162,788

(22) PCT Filed: Jan. 26, 2007

(86) PCT No.: PCT/JP2007/051268

§ 371 (c)(1),
(2), (4) Date: Aug. 26, 2008

(87) PCT Pub. No.: WO2007/088789

PCT Pub. Date: Aug. 9, 2007

(65) Prior Publication Data

US 2009/0009773 A1    Jan. 8, 2009

(30) Foreign Application Priority Data

Feb. 1, 2006   (JP) .............................. 2006-024825

(51) Int. Cl.
*G01B 11/02* (2006.01)
(52) U.S. Cl. ....................................................... 356/511
(58) Field of Classification Search ................. 356/511, 356/485, 489, 495
See application file for complete search history.

(56) References Cited

U.S. PATENT DOCUMENTS

| 4,744,659 | A | 5/1988 | Kitabayashi |
| 6,501,553 | B1 * | 12/2002 | Ogawa et al. ............... 356/512 |
| 2004/0027581 | A1 * | 2/2004 | Dulman ...................... 356/511 |

FOREIGN PATENT DOCUMENTS

| JP | 61-230002 A | 10/1986 |
| JP | 05-306916 A | 11/1993 |
| JP | 10-096602 A | 4/1998 |
| JP | 2002-202112 A | 7/2002 |

OTHER PUBLICATIONS

International Search Report for the Application No. PCT/JP2007/051268 mailed Apr. 17, 2007.
Kato, Jun-ichi, "Real-Time Fringe Analysis for Interferometry and Its Applications", Journal of the Japan Society of Precision Engineering, 1998, vol. 64, No. 9, pp. 1289-1293.

* cited by examiner

*Primary Examiner*—Tarifur Chowdhury
*Assistant Examiner*—Jonathan M Hansen
(74) *Attorney, Agent, or Firm*—Cheng Law Group, PLLC

(57) ABSTRACT

A reference plane is arranged in a posture obliquely tilted at an optional angle relative to a traveling direction of a light-beam, so that an interference fringe is generated from the reflected light-beams which are reflected from a target plane and the reference plane and, then, return on a single optical path. An image of the interference fringe is taken by a CCD camera to acquire intensity value data of each pixel. A phase of an interference fringe waveform is obtained for each pixel by a CPU by fitting the intensity value data to a model equation expressing the interference fringe waveform, where the intensity value data contain that of each pixel and those of the pixels in the vicinity of the relevant pixel, on assumption that DC components, AC amplitudes and phases of the interference fringe waveforms are respectively constant in the vicinity of the relevant pixel. The obtained phase is converted into a height to measure a surface profile.

8 Claims, 4 Drawing Sheets

Fig.3
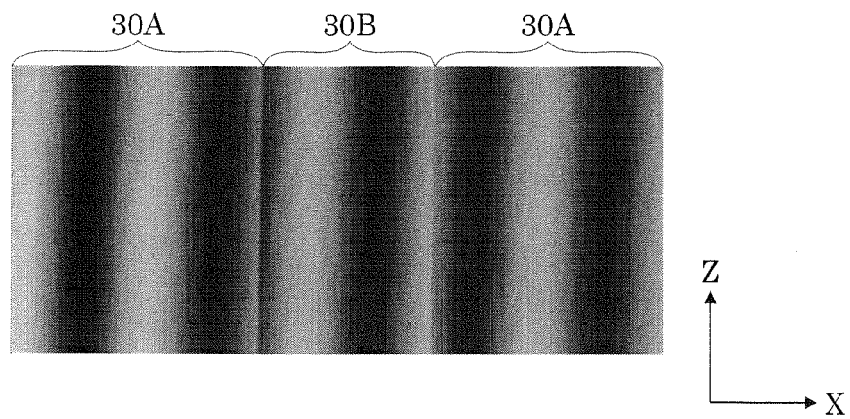
Fig.4
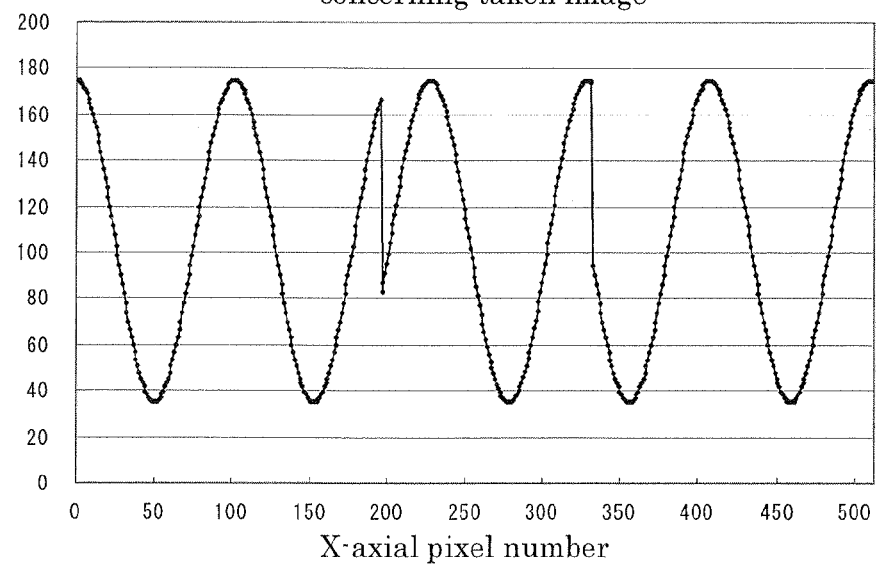
Fig.5
| $\phi$ | 0 | ... | $\pi/2$ | ... | $\pi$ | ... | $3\pi/2$ | ... | $2\pi$ |
|---|---|---|---|---|---|---|---|---|---|
| $\tan\phi$ | 0 | + | $\infty$ | − | $\infty$ | + | $\infty$ | − | $\infty$ |
| $\sin\phi$ | 1 | + | 0 | − | −1 | − | 0 | − | 1 |
| $\cos\phi$ | 0 | + | 1 | + | 0 | − | −1 | − | 0 |

METHOD FOR MEASURING SURFACE PROFILE, AND APPARATUS USING THE SAME

TECHNICAL FIELD

The present invention relates to a surface profile measuring method for measuring unevenness of a target object having a flatness, such as a semiconductor wafer, a liquid crystal panel, a plasma display panel or a magnetic film, and an apparatus using the same. In particular, the present invention relates to a technique of measuring a surface profile of a target object in a non-contact manner through use of a monochromatic light-beam.

BACKGROUND ART

Conventionally, a method for measuring a surface profile of a target plane has been performed as follows. This method involves: emitting a monochromatic light-beam outputted from a monochromatic light source to a reference plane arranged in a posture so as to be obliquely tilted at an optional angle relative to a traveling direction of the light-beam divided by a dividing means and a target plane; and taking one image of an interference fringe generated by the reflected light-beams which are reflected from both the target plane and the reference plane and, then, return on a single optical path. From image data acquired by this image taking operation, first, intensity value data of the interference fringe is obtained on a pixel basis. That is, there is used the following equation which is a computational algorithm for obtaining intensity value data g(x).

$$g(x)=a(x)+b(x)\cos\{2\pi fx+\phi(x)\}$$

Herein, a(x) represents a DC component contained in an interference fringe waveform having the intensity value data g(x) of the light-beam, b(x) represents an AC amplitude contained in the interference fringe waveform, f represents a spatial frequency component of the intensity value data g(x) of the light-beam, and $\phi(x)$ represents a phase corresponding to a predetermined pixel on the target plane.

Examples of a method for obtaining the phase $\phi(x)$ include a Fourier transform method, a spatial-phase synchronization method and the like, as described in Patent Document 1.

That is, when a phase is obtained for each pixel, the phase of each pixel is substituted into an equation, $z(x)=[\phi(x)/4\pi]\lambda+z_0$, which is a computational algorithm for calculating, for each pixel, a surface height of a target plane. Then, a surface profile is specified based on data of these surface heights z(x). Herein, $z_0$ represents a reference height of a single sample surface.

Non-patent Document 1: "Precision Engineering", Vol. 64, No. 9, pp. 1290-1291 (1998)

DISCLOSURE OF THE INVENTION

Problems to be Solved by the Invention

However, such a conventional method has the following problems.

In a case of executing a filtering process on an entire area, like low-pass filtering, first, a spatial resolution in a height direction decreases, so that an edge is disadvantageously rounded at a steep portion on a target plane. That is, there is a problem that a surface height of an uneven portion on the target plane can not be measured accurately.

In the case of executing the filtering process on the entire area, like Fourier transform, inverse transform or low-pass filtering, moreover, a complicated arithmetic process must be used, resulting in a problem that a calculation cost becomes high and a processing time becomes long.

This invention has been devised in view of the circumstances described above, and a principal object thereof is to provide a surface profile measuring method capable of promptly and precisely measuring an uneven step difference on a surface of a target object, and an apparatus using the same.

Means for Solving the Problems

In order to achieve the object described above, therefore, this invention adopts the following configuration.

That is, a first invention is a surface profile measuring method for emitting a monochromatic light-beam outputted from a monochromatic light source onto a target plane and a reference plane through a dividing means to obtain a surface height and a surface profile of the target plane based on intensity value data of an interference fringe generated from the reflected light-beams which are reflected from both the target plane and the reference plane and, then, return on a single optical path, the surface profile measuring method comprising:

a first step of acquiring an image of the interference fringe generated in a state that the reference plane is arranged in a posture obliquely tilted at an optional angle relative to a traveling direction of the light-beam;

a second step of obtaining the intensity value data of the interference fringe in the acquired image for each pixel;

a third step of obtaining a phase of each pixel by a model equation expressing an interference fringe waveform, where the intensity value data contain that of each pixel and those of plural pixels in the vicinity of the relevant pixel, on assumption that DC components, AC amplitudes and phases of the interference fringe waveforms are respectively constant in the vicinity of the relevant pixel;

a fourth step of obtaining the surface height of the target plane from the obtained phase of each pixel; and a fifth step of obtaining the surface profile from the obtained surface height of the target plane.

According to this measuring method, the reference plane is arranged in the posture obliquely tilted at the optional angle relative to the traveling direction of the light-beam, so that the interference fringe is generated from the reflected light-beams which are reflected from the target plane and the reference plane and, then, return on the single optical path. The intensity value data of the interference fringe is obtained on a pixel basis. The phase of each pixel is obtained by fitting the intensity value data to the model equation expressing the interference fringe waveform, where the intensity value data contain that of each pixel and those of the pixels in the vicinity of the relevant pixel, on assumption that the DC components, the AC amplitudes and the phases of the interference fringe waveforms are respectively constant in the vicinity of the relevant pixel. Herein, the DC component and the AC amplitude can be canceled in each pixel, so that there is no necessity of executing low-pass filtering for removing a spatial frequency component. Thus, it is possible to avoid degradation of a spatial resolution occurring due to an influence of the low-pass filtering, and to accurately obtain an edge of a steep portion on a target plane. In addition, since there is no necessity of using a complicated arithmetic process such as Fourier transform, inverse transform or filtering, it is possible to lessen a calculation load and to reduce a processing time. That is, it is possible to improve operating efficiency.

In the measuring method of the invention described above, preferably, the phase is obtained in such a manner that the intensity value data g(x) of each pixel is fitted to an equation, g(x)=a+b cos {2πfx+φ(x)}, which is the model equation of the interference fringe waveform, in the vicinity of the relevant pixel.

According to this measuring method, the intensity value data g(x) of each pixel is fitted to the model equation for the interference fringe waveform, that is, g(x)=a+b cos {2πfx+φ(x)}, in the vicinity of the pixel, so that the phase of each pixel can be obtained with ease. That is, the first invention described above can be suitably implemented by using a simple arithmetic formula.

In the fitting to the model equation described above, preferably, a spatial frequency component of the interference fringe waveform is set so as to be a predetermined value, and signs of a sin φ component and a cosφ component in the obtained phase are obtained, so that a range of φ(x) in the model equation is specified based on a combination of sign information of the two components.

In the configuration described above, more preferably, a wavelength of the monochromic light-beam outputted from the monochromic light source is adjusted, and a spatial frequency component of the interference fringe waveform is set so as to be a predetermined value, the calculating means further includes a sign determination part for determining signs of a sin φ component and a cos φ component in the obtained phase, and a range of φ(x) in the model equation is specified based on a combination of sign information of the two components obtained by the sign determination part. For example, in the model equation, φ(x) is expressed as follows: φ=arc tan {S/C}+2nπ (n=a positive integer). Herein, S is equal to b sin φ and C is equal to b cos φ.

By use of this model equation, the phase data of the light-beam of the target pixel can be obtained through use of the plural pixels, that is, N pieces of pixels in the vicinity of the relevant pixel. As a result, it is possible to improve measurement accuracy.

According to the measuring method described above, moreover, in the first step, for example, the target object is moved, and the image of the target plane is acquired at a predetermined sampling time interval which is synchronized with a moving speed of the target object.

According to this measuring method, the surface of the single target object is scanned, so that the surface height and the surface profile thereof can be obtained successively. Moreover, plural target objects are transported on a transportation path or are moved while being placed on a movable table and, simultaneously, heights and surface profiles of the plural target objects can be obtained successively.

In order to achieve the object described above, this invention also adopts the following configuration.

That is, a surface profile measuring apparatus for emitting a monochromatic light-beam outputted from a monochromatic light source onto a target plane and a reference plane through a dividing means to obtain a surface height and a surface profile of the target plane based on an intensity value data of an interference fringe generated from the reflected light-beams which are reflected from both the target plane and the reference plane and, then, return on a single optical path, the surface profile measuring apparatus comprising:

the reference plane being arranged in a posture obliquely tilted at an optional angle relative to a traveling direction of the light-beam, an image taking means for taking the image of the target plane as the interference fringe generated from the reflected light-beams, which are reflected from the target object and the reference plane each irradiated with the monochromatic light-beam and, then, return on the single optical path;

a sampling means for capturing the taken image of the target plane, as the intensity value data of the interference fringe for each pixel of the image of the target plane;

a storing means for storing an interference fringe intensity value data group each of which is the intensity value data captured by the sampling means; and a calculating means for reading the intensity value data for each pixel from the intensity value data group stored in the storing means, utilizing the interference fringe waveform, where the intensity value data contain that of each pixel and those of the pixels in the vicinity of the relevant pixel, assuming that DC components, AC amplitudes and phases of the interference fringe waveforms are respectively constant in the vicinity of the relevant pixel, obtaining the phase of each pixel by a model equation expressing the interference fringe waveform, obtaining a surface height of the target plane from the obtained phase of each pixel, and obtaining a surface profile from the obtained surface height of the target plane.

According to this configuration, the image taking means takes the image of the target plane as the interference fringe generated from the reflected light-beams, which are reflected from the target object and the reference plane each irradiated with the monochromatic light-beam and, then, return on the single optical path. The sampling means captures the taken image of the target plane, as the intensity value data of the interference fringe for each pixel of the image of the target plane. The storing means stores the interference fringe intensity value data group each of which is the intensity value data captured by the sampling means. The calculating means reads the intensity value data for each pixel from the intensity value data group stored in the storing means, utilizes the interference fringe waveform, where the intensity value data contain that of each pixel and those of the pixels in the vicinity of the relevant pixel, assumes that the DC components, the AC amplitudes and the phases of the interference fringe waveforms are respectively constant in the vicinity of the relevant pixel, obtains the phase of each pixel by the model equation expressing the interference fringe waveform, obtains the surface height of the target plane from the obtained phase of each pixel, and obtains the surface profile from the obtained surface height of the target plane.

That is, the DC component and the AC amplitude of the interference fringe can be canceled in each pixel by the simultaneous comparison of the respective pixels. As a result, there is no necessity of executing low-pass filtering for removing a spatial frequency. That is, the first invention described above can be suitably realized.

In the measuring apparatus, preferably, the calculating means obtains the intensity value data g(x) of each pixel in such a manner that the intensity value data g(x) of each pixel is fitted to an equation, g(x)=a+b cos {2πfx+φ(x)}, which is the model equation of the interference fringe waveform, in the vicinity of the relevant pixel.

According to this configuration, the intensity value data g(x) of each pixel is fitted to the model equation for the interference fringe waveform, that is, g(x)=a+b cos {2πfx+φ(x)}, in the vicinity of the pixel, so that the phase of each pixel can be obtained with ease. That is, the measuring method described above can be suitably realized.

In the configuration described above, preferably, a wavelength of the monochromic light-beam outputted from the monochromic light source is adjusted, and a spatial frequency component of the interference fringe waveform is set so as to be a predetermined value, the calculating means further includes a sign determination part for determining signs of a sin φ component and a cos φ component in the obtained phase, and a range of φ(x) in the model equation is specified based on a combination of sign information of the two components obtained by the sign determination part. For example, in the model equation, φ(x) is expressed as follows: φ=arc tan {S/C}+2nπ (n=a positive integer). Herein, S is equal to b sin φ and C is equal to b cos φ.

According to this configuration, the phase data of the light-beam of the target pixel can be obtained through use of the plural pixels, that is, N pieces of pixels in the vicinity of the relevant pixel. As a result, it is possible to improve measurement accuracy.

Moreover, the wavelength of the monochromatic light-beam outputted from the monochromatic light source may be adjustable optionally.

EFFECTS OF THE INVENTION

With the surface profile measuring method and the apparatus using the same according to the present invention, the interference fringe is generated from the reflected light-beams, which are reflected from the reference plane in the posture obliquely tilted at the optional angle and the substantially flat target plane and, then, return on the single optional path, to obtain the intensity value data for each pixel. Then, the phase of each pixel is obtained by fitting the intensity value data to the model equation expressing the interference fringe waveform, where the intensity value data contain that of each pixel and those of the pixels in the vicinity of the relevant pixel, on assumption that the DC components, the AC amplitudes and the phases of the interference fringe waveforms are respectively constant in the vicinity of the relevant pixel. As a result, it becomes unnecessary to execute a filtering process such as low-pass filtering for removing a spatial frequency component. Moreover, it is possible to avoid decrease of a spatial resolution occurring due to an influence of the filtering process and to accurately measure an edge of a steep portion on a target plane. Hence, it is possible to precisely measure an uneven step difference on the target plane. It becomes unnecessary to use a complicated arithmetic process such as Fourier transform, inverse transform or filtering; therefore, it is possible to lessen a calculation cost and to reduce a processing time. That is, it is possible to improve operating efficiency.

BRIEF DESCRIPTION OF THE DRAWINGS

FIG. 3 shows image data of a taken image of a target plane.

FIG. 4 shows a change of luminance in an X-axis direction concerning the taken image.

FIG. 5 shows a fact that a range of φ can be specified through use of sign information of sin φ and cos φ.

DESCRIPTION OF REFERENCE SYMBOLS

Figure 1:
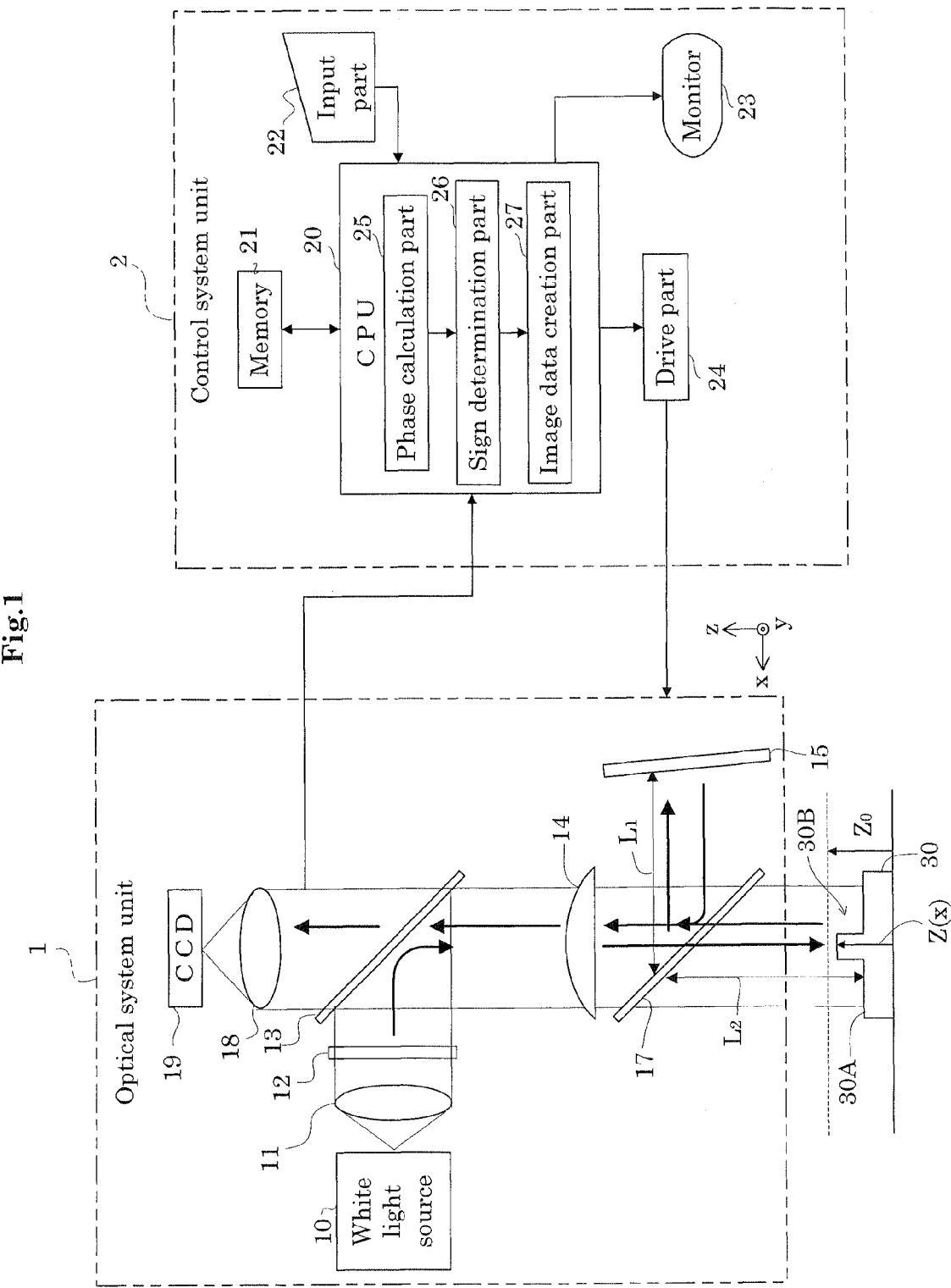
FIG. 1 shows a schematic configuration of a surface profile measuring apparatus according to the present embodiment.

1 . . . Optical system unit
2 . . . Control system unit
10 . . . White light source
11 . . . Collimator lens
12 . . . Band-pass filter
13 . . . Half mirror
14 . . . Objective lens
15 . . . Reference plane
17 . . . Beam splitter
18 . . . mage forming lens
19 . . . CCD camera
20 . . . CPU
21 . . . Memory
22 . . . Input part
23 . . . Monitor
24 . . . Drive part
25 . . . Phase calculation part
26 . . . Sign determination part
27 . . . Image data creation part
30 . . . Target object
30A . . . . Target plane
30B . . . . Protrusion on target plane

BEST MODE FOR CARRYING OUT THE INVENTION

With reference to the drawings, hereinafter, description will be given of an embodiment of the present invention. It is to be noted that, in the present embodiment, description will be given of, as an example, a surface profile measuring apparatus that measures a surface height and a surface profile of a target object having a substantially flat surface through use of an interference fringe.

FIG. 1 shows a schematic configuration of the surface profile measuring apparatus according to the embodiment of the present invention.

This surface profile measuring apparatus is configured to include: an optical system unit 1 that emits a monochromatic light-beam in a specific wavelength band onto a substantially flat target object 30 having a minute uneven step difference at its surface, such as a semiconductor wafer, a glass substrate or a metal film; and a control system unit 2 that controls the optical system unit 1.

The optical system unit 1 is configured to include: a white light source 10 that serves as a light source for generating a light-beam to be emitted to a target plane 30A and a reference plane 15; a collimator lens 11 that converts the white light-beam from the white light source 10 into a parallel light-beam; a band-pass filter 12 that allows only a monochromatic light-beam in a specific frequency band to transmit therethrough; a half mirror 13 that guides the light-beam transmitting through the band-pass filter 12 toward the target object 30, and allows the light-beam from the target object 30 to transmit therethrough; an objective lens 14 that converges the monochromatic light-beam reflected from the half mirror 13; a beam splitter 17 that splits the monochromatic light-beam transmitting through the objective lens 14 into a reference light-beam guided toward the reference plane 15 and a measurement light-beam transmitted to the target plane 30A, and integrates the reference light-beam reflected from the reference plane 15 and the measurement light-beam reflected from the target plane 30A into one again to generate an interference fringe; an image forming lens 18 that forms an image from the monochromatic light-beam obtained by integration of the reference light-beam and the measurement light-beam; and a CCD camera 19 that takes an image of the interference fringe and the target plane 30A. It is to be noted that the CCD camera 19 corresponds to an image taking means of the present invention.

The white light source 10 is, for example, a halogen lamp or the like, and generates a white light-beam in a relatively wide frequency band. The white light-beam generated by the white light source 10 is converted into a parallel light-beam by the collimator lens 11, and transmits through the band-pass filter 12 in which the white light-beam is converted into a monochromatic light-beam in a specific frequency band. The monochromatic light-beam is guided to the half mirror 13.

The half mirror 13 guides the parallel light-beam from the collimator lens 11 toward the target object 30, and allows the light-beam reflected from the target object 30 to transmit therethrough. The monochromatic light-beam in the specific frequency band is reflected from the half mirror 13, and then is made incident to the objective lens 14.

The objective lens 14 is a lens for converging the incoming light-beam at a focal point P. The light-beam converged by the objective lens 14 reaches the beam splitter 17.

The beam splitter 17 splits the light-beam converged by the objective lens 14 into a reference light-beam to be reflected by the reference plane 15 and a measurement light-beam to be reflected by the target plane 30A. Moreover, the beam splitter 17 integrates the reference light-beam and the measurement light-beam, which are reflected from the respective planes and, then, return on a single optical path, into one again to cause interference. The light-beam that has reached the beam splitter 17 is split into the reference light-beam reflected by the plane of the beam splitter 17 and the measurement light-beam transmitting through the beam splitter 17. The reference light-beam reaches reference plane 15, and the measurement light-beam reaches the target plane 30A.

The reference plane 15 is attached in a posture obliquely tilted in a front-to-back direction relative to a traveling direction of the reference light-beam. The reference light-beam reflected from the reference plane 15 reaches the beam splitter 17 and, further, is reflected by the beam splitter 17.

When the reference plane 15 is attached in the posture obliquely tilted in the front-to-back direction relative to the traveling direction of the reference light-beam, a reaching distance of the reference light-beam and a distance until the reflected light-beam reaches the CCD camera 19 vary in accordance with the position of the reflection plane. This is equivalent to a variation of a distance $L_1$ between the reference plane 15 and the beam splitter 17 by the shift of the reference plane 15.

The measurement light-beam transmitting through the beam splitter 17 is converged toward the focal point, and then is reflected by the target plane 30A. This reflected measurement light-beam reaches the beam splitter 17, and then transmits through the beam splitter 17.

The beam splitter 17 integrates the reference light-beam and the measurement light-beam into one again. Herein, an optical path difference is caused by a difference between the distance $L_1$ between the reference plane 15 and the beam splitter 17 and a distance $L_2$ between the beam splitter 17 and the target plane 30A. In accordance with this optical path difference, the reference light-beam and the measurement light-beam interfere with each other. The light-beam in which this interference occurs transmits through the half mirror 13, and then is formed into an image by the image forming lens 18. This image is made incident to the CCD camera 19.

The CCD camera 19 takes an image of the target plane 30A which is formed from the measurement light-beam. Herein, since the reference plane 15 is tilted, the taken image of the target plane 30A contains an interference fringe which is a spatial variation of luminance due to interference. Image data of the taken image is collected by the control system unit 2. As will be described later, moreover, a drive part 24 of the control system unit 2 shifts the optical system unit 1 to a desired image taking point in an x-, y- or z-axis direction in FIG. 1. Moreover, the image of the target plane 30A is taken by the CCD camera 19 at a predetermined sampling timing, and image data of the taken image is collected by the control system unit 2.

The control system unit 2 is configured by a computer system including: a CPU 20 that collectively controls the entire surface profile measuring apparatus and executes a predetermined arithmetic process; a memory 21 that stores image data successively collected by the CPU 20, various kinds of data such as a result of the arithmetic process in the CPU 20, and programs; an input part 22, such as a mouse or a keyboard, that receives other kinds of setting information such as a sampling timing and an image taking area; a monitor 23 that displays an image of the target plane 30A, and the like; and the drive part 24 that is configured by a driving mechanism such as a three-axis servo motor for driving the optical system unit 1 in accordance with a command from the CPU 20 such that the optical system unit 1 moves upward, downward, leftward or rightward. It is to be noted that the CPU 20 corresponds to a calculating means in the present invention, and the memory 21 corresponds to a storing means in the present invention.

The CPU 20 is a so-called central processing unit, controls the CCD camera 19, the memory 21 and the drive part 24, and includes a phase calculation part 25 and an image data creation part 27 that execute an arithmetic process for obtaining a surface height of the target object 30 based on the image data of the image of the target plane 30A, which is taken by the CCD camera 19 and contains the interference fringe. Processes executed by the phase calculation part 25 and the image data creation part 27 in the CPU 20 will be described later in detail. Further, the monitor 23 and the input part 22 such as a keyboard or a mouse are connected to the CPU 20, and an operator inputs various kinds of setting information through the input part 22 while observing an operation screen displayed on the monitor 23. In addition, the monitor 23 displays, as a numeric value or an image, a surface image and an uneven shape of the target plane 30A.

The drive part 24 is a device that shifts, for example, the optical system unit 1 to a desired image taking point in the x-, y- or z-direction in FIG. 1. The drive part 24 is configured by the driving mechanism including, for example, the three-axis servo motor for driving the optical system unit 1 in the x-, y- or z-axis direction based on the command from the CPU 20. It is to be noted that, in the present embodiment, the optical system unit 1 is actuated; however, a table (not shown) on which the target object 30 is placed may be shifted in an orthogonal three-axis direction, for example. Alternatively, the number of moving axes may be not more than two or zero.

Figure 2:
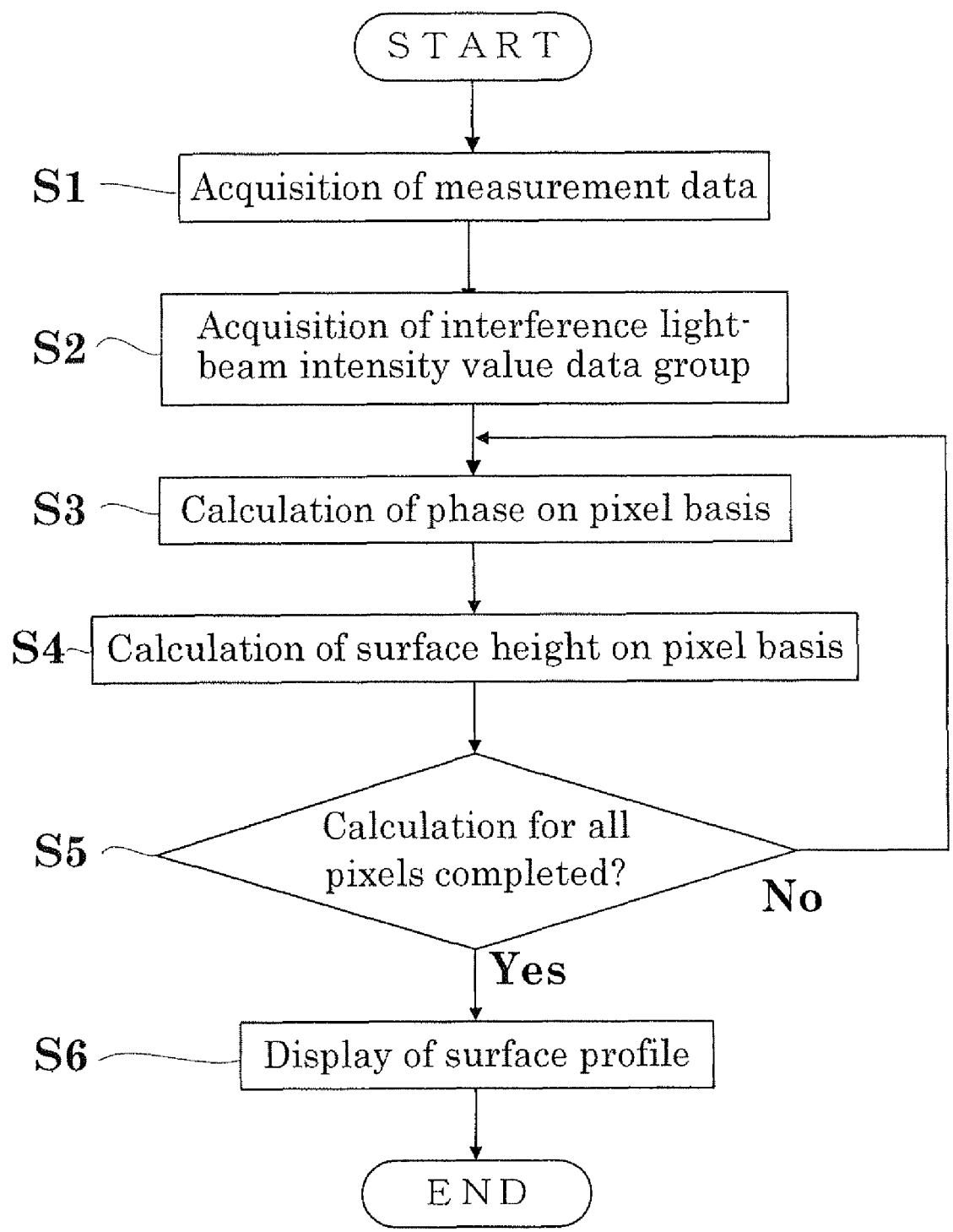
FIG. 2 is a flowchart showing processes in the surface profile measuring apparatus.

Hereinafter, description will be given of processes executed by the entire surface profile measuring apparatus, which is a characteristic portion in the present embodiment, in accordance with a flowchart shown in FIG. 2.

It is to be noted that, in the present embodiment, description will be given of, as an example, the case where the reference plane 15 is tilted as shown in FIG. 1. In this case, an image to be taken is as shown in FIG. 3.

<Step S1> Acquisition of Measurement Data

The CPU 20 drives a driving system such as a stepping motor (not shown) so that the drive part 24 allows the optical unit 1 to move toward the image taking area in the target object 30. After determination of the image taking position, the optical system unit 1 allows the white light source 10 to generate a white light-beam. This white light-beam is converted into a monochromatic light-beam (e.g., a wavelength λ=600 nm) through the band-pass filter 12, and then the monochromatic light-beam is emitted onto the target object 30 and the reference plane 15.

In accordance with the emission of this monochromatic light-beam, the CCD camera 19 is actuated to take one image of the target plane 30A having a protrusion 30B shown in FIG. 1, for example. Image data of an interference fringe of the target plane 30A which is acquired by this image taking operation is collected and stored in the memory 21. That is, image data of an interference fringe which is generated from a light-beam reflected from the reference plane 15 in the tilted posture and a return light-beam reflected from the target plane 30A is stored in the memory 21. Herein, a propagating distance of the light-beam reflected from the reference plane 15 (twice as long as $L_1$) varies regularly at a reflection position of the reference plane 15. At a portion where a height of the target plane 30A is flat, accordingly, a propagating distance of the return light-beam reflected from the target plane 30A (twice as long as $L_2$) does not vary at a measurement position; therefore, the interference fringe in the image taken by the CCD camera 19 spatially and regularly appears in the image taking plane in accordance with a tilt direction and a tilt angle of the reference plane 15. This interference fringe appears in an amount corresponding to one cycle each time a difference between the propagating distance of the light-beam reflected from the reference plane 15 (twice as long as $L_1$) and the propagating distance of the return light-beam reflected from the target plane 30A (twice as long as $L_2$) satisfies an equation, λ/2=300 nm.

As shown in FIG. 1, on the other hand, the interference fringe appears as a displaced irregular fringe pattern at the position where the height of the target plane 30A varies.

It is to be noted that this step corresponds to a first step in the present invention.

<Step S2> Acquisition of Interference Light-Beam Intensity Value Data Group

The CPU 20 captures, from the image data, intensity value data of each pixel obtained by the image taking operation and stored in the memory 21, that is, intensity value data of the interference light-beam of the target plane 30A. As shown in FIG. 4, herein, a spatial phase of the interference fringe appears as an irregular fringe pattern displaced (in an X-axis direction in the present embodiment shown in FIG. 4, for example) at the portion where the height of the target plane 30A and the height of the protrusion 30B vary.

It is to be noted that this step corresponds to a second step in the present invention.

<Step S3> Calculation of Phase on Pixel Basis

The phase calculation part 25 of the CPU 20 obtains a phase in a pixel to be calculated on the target plane 30A through use of a computational algorithm which is determined in advance through use of light-beam intensity value data of an interference fringe in the relevant pixel and light-beam intensity value data of an interference fringe in a pixel in the vicinity of the relevant pixel (a pixel in the vicinity of the x-axis direction in the present embodiment). Specifically, the intensity value data of the light-beam of the interference fringe in the pixel to be calculated and the intensity value data of the light-beam of the interference fringe in the pixel in the vicinity of the relevant pixel are fitted to a model equation for obtaining the interference fringe wavelength, so that the phase is obtained.

First, the intensity value data of the light-beam of the interference fringe in the pixel to be calculated is described as the following expression (1).

$$g(x)=a(x)+b(x)\cos\{2\pi fx+\phi(x)\} \quad (1)$$

Herein, x represents a positional coordinate of the pixel to be calculated, a(x) represents a DC component contained in the interference fringe waveform, b(x) represents an AC component contained in the interference fringe waveform (i.e., an amplitude of a vibration component, hereinafter, referred to as "an AC amplitude" appropriately), f represents a spatial frequency component of the intensity value data of the light-beam of the interference fringe g(x), and φ(x) represents a phase corresponding to a predetermined pixel on the target plane 30A. It is to be noted that the positional coordinate of the pixel to be calculated is represented as (x, y) in a two dimensional manner; however, the y-coordinate is not described for the sake of facilitating the description in the present embodiment.

Next, since the pixel in the vicinity of the pixel to be calculated is displaced from the pixel to be calculated in the x-axis direction by a minute distance Δx, the intensity value data of the light-beam of the interference fringe therein is expressed as the following equation (2).

$$g(x+\Delta x)=a(x+\Delta x)+b(x+\Delta x)\cos\{2\pi f(x+\Delta x)+\phi(x+\Delta x)\} \quad (2)$$

In the present embodiment, since a pitch between the pixel to be calculated and the pixel in the vicinity of the pixel to be calculated is the minute distance, the following relational equations (3) to (5) are utilized on assumption that the DC components, the AC amplitudes and the phases of the interference fringe waveforms are respectively constant in the vicinity of the relevant pixel.

$$a(x)=a(x+\Delta x)=a \quad (3)$$

$$b(x)=b(x+\Delta x)=b \quad (4)$$

$$\phi(x)=\phi(x+\Delta x)=\phi \quad (5)$$

Herein, a, b and φ each represents a constant.

By the assumption in the equations (3) to (5), the following equations (1a) and (2a) can be substituted for the equations (1) and (2), respectively.

$$g(x)=a+b\cos\{2\pi fx+\phi(x)\} \quad (1a)$$

$$g(x+\Delta x)=a+b\cos\{2\pi f(x+\Delta x)+\phi(x+\Delta x)\} \quad (2a)$$

Next, the equations (1a) and (2a) are deformed to obtain the following equations (6) and (7).

$$G(x)=g(x)-a=b\cos(2\pi fx+\phi) \quad (6)$$

$$G(x+\Delta x)=g(x+\Delta x)-a=b\cos\{2\pi f(x+\Delta x)+\phi\} \quad (7)$$

Next, the equations (6) and (7) are deformed as the following equations (8) and (9) by an addition theorem.

$$\begin{aligned}G(x) &= b\cos(2\pi fx+\phi)\\ &= b\{\cos(2\pi fx)\cos\phi\} - \sin(2\pi fx)\sin\phi\}\end{aligned} \quad (8)$$

$$\begin{aligned}G(x+\Delta x) &= b\cos\{2\pi f(x+\Delta x)+\phi\}\\ &= b[\cos\{2\pi f(x+\Delta x)\cos\phi - \sin(2\pi fx+\Delta x)\sin\phi\}]\end{aligned} \quad (9)$$

Next, these equations (8) and (9) are expressed by a matrix (10).

$$\begin{pmatrix} G(x) \\ G(x+\Delta x) \end{pmatrix} = A \begin{pmatrix} b\cos\phi \\ b\sin\phi \end{pmatrix} \quad (10)$$

Herein, A is expressed as follows.

$$A = \begin{pmatrix} \cos(2\pi f x) & -\sin(2\pi f x) \\ \cos\{2\pi f(x+\Delta x)\} & -\sin\{2\pi f(x+\Delta x)\} \end{pmatrix}$$

For development, herein, an inverse matrix of A is multiplied from a left side of the matrix (10) to obtain the following equations (11) and (12).

$$\frac{G(x)\sin\{2\pi f(x+\Delta x)\} - G(x+\Delta x)\sin(2\pi f x)}{\sin(2\pi \Delta f x)} = b\cos\phi \quad (11)$$

$$\frac{G(x)\cos\{2\pi f(x+\Delta x)\} - G(x+\Delta x)\cos(2\pi f x)}{\sin(2\pi \Delta f x)} = b\sin\phi \quad (12)$$

The following equation (13) can be obtained through use of these equations (11) and (12). Herein, $b\sin\phi$ and $b\cos\phi$ described above are defined as S and C, respectively, and further $\tan\phi$ is equal to S/C.

$$\phi = \arctan\{S/C\} + n'\pi \quad (13)$$

Herein, n' represents an integer.

Herein, the CPU 20 further includes a sign determination part 26, and this sign determination part 26 refers to sign information of $\sin\phi$ and $\cos\phi$. Through use of the sign information, an existing range of $\phi$ can be extended from $\pi$ to $2\pi$ based on a combination of the sign of $\sin\phi$ and the sign of $\cos\phi$. FIG. 5 is a specific figure for specifying the range of $\phi$ with reference to the sign information of $\sin\phi$ and the sign information of $\cos\phi$ as expressed by the equation (13). Through use of the sign information of $\sin\phi$ and the sign information of $\cos\phi$, accordingly, the equation (13) can be expressed as the following equation (14).

$$\phi = \arctan\{S/C\} + 2n\pi \quad (14)$$

Herein, n represents an integer.

Thus, if G(x) and a spatial frequency f of an interference fringe waveform are already known, a phase $\phi$ can be obtained from the equation (14). Since G(x) is composed of luminance information g(x) and g(x+$\Delta$x) of the pixel and a DC component a of the interference fringe waveform, $\phi$ can be obtained from the equation (14) if g(x) and g(x+$\Delta$x), the DC component a of the interference fringe waveform, and the spatial frequency f of the interference fringe waveform are already known as a result.

Herein, g(x) and g(x+$\Delta$x) can be obtained as luminance information of the pixel of the CCD camera 19.

For example, a can be obtained by a method of obtaining an average value of luminance of all pixels observed by the CCD camera 19, a method of obtaining an average value of pixels in the vicinity of a pixel to be subjected to phase calculation, a method of measuring a reflectivity in advance, or the like.

For example, f can be obtained by a method of obtaining from an installation angle of the reference plane 15, a method of obtaining from the number of interference fringes in a screen of an interference fringe waveform in a case where a flat plane is observed as a target object in advance, or the like.

It is to be noted that this step corresponds to a third step of the present invention.

<Step S4> Calculation of Reference Height on Pixel Basis

The CPU 20 substitutes the phase $\phi(x)$ of the pixel to be calculated, which is calculated from the equation (14), into the following equation (15) to obtain a height z(x).

$$z(x) = [\phi(x)/4\pi f]\lambda + z_0 \quad (15)$$

Herein, $z_0$ represents a reference height of the target object 30.

It is to be noted that this step corresponds to a fourth step in the present invention.

<Step S5> Calculation for all Pixels Completed?

The CPU 20 repeatedly executes the processes in step S3 to S4 until completion of the calculation of the phase and height for all the pixels to obtain a phase and a surface height.

<Step S6> Display of Surface Profile

Figure 6:
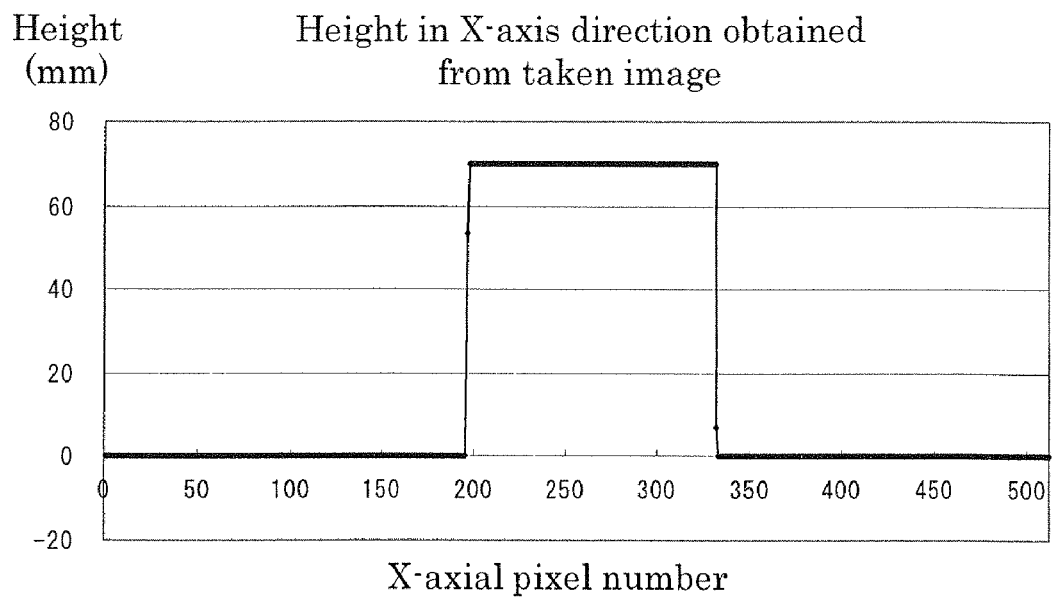
FIG. 6 shows a result of measurement in a case of measuring a steep step difference through use of the apparatus according to the present embodiment.

The image data creation part 27 of the CPU 20 creates a display image of the target plane 30A from the information of the calculated surface height. As shown in FIG. 6, then, based on the information created by the image data creation part 27, the CPU 20 allows the monitor 23 to display the information of the surface height of the target object 30 or to display a three-dimensional or two-dimensional image based on information of heights of the respective specific portions. The operator observes the display to grasp an uneven shape on the surface of the target plane 30A. Thus, the process of measuring the surface profile of the target plane 30A is completed.

It is to be noted that this step corresponds to a fifth step in the present invention.

As described above, in the step of calculating the intensity value data of the light-beam of the interference fringe for each pixel and the plural pieces of intensity value data of the plural pixels in the vicinity of the relevant pixel from the image data of the image taken by the CCD camera 19, simultaneous comparison is performed on assumption that the DC components a(x), the AC amplitudes b(x) and the phases $\phi(x)$ of the interference fringe waveforms are respectively constant in the vicinity of the relevant pixel, so that the DC component and the AC amplitude of the interference fringe can be canceled in each pixel.

Figure 7:
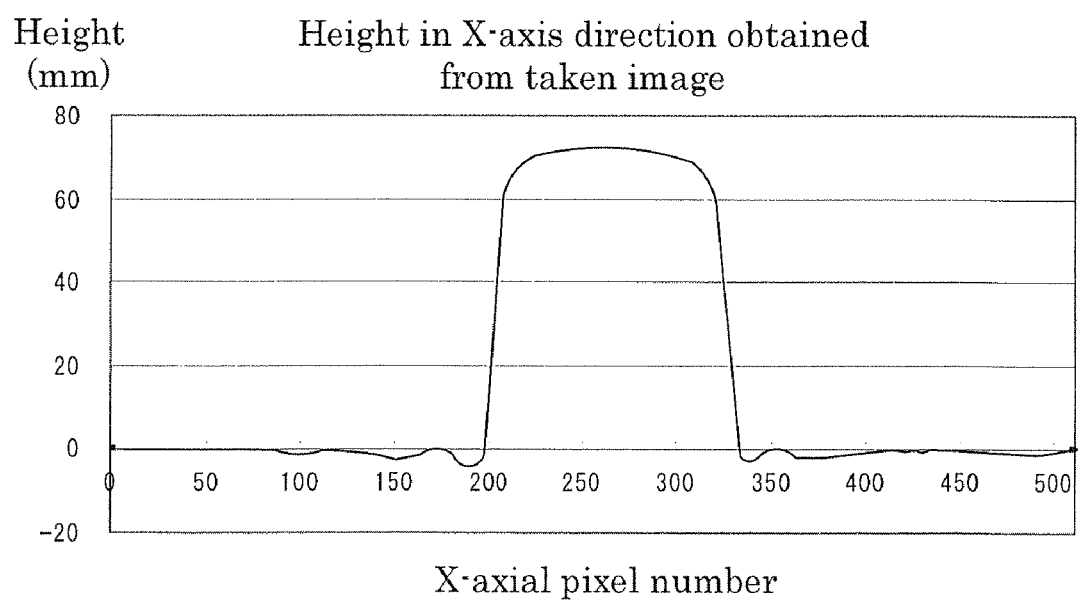
FIG. 7 shows a result of measurement in a case of measuring a steep step difference through use of a conventional apparatus.

Accordingly, if the surface of the target object 30 is measured by a conventional method, low-pass filtering must be executed; consequently, the edge of the protrusion 30B is rounded as shown in FIG. 7. In the case of the present embodiment, on the other hand, the surface height of the target plane 30A can be measured without use of a low-pass filter; therefore, the surface height of the steep edge (in the vicinity of X-axial pixel numbers 200, 340) of the target plane 30A can be obtained precisely as shown in FIG. 6. As a result, the surface profile of the target plane 30A can be measured precisely.

Moreover, there is no necessity of using a complicated arithmetic process such as Fourier transform, inverse transform or filtering; therefore, it is possible to lessen a calculation load and to reduce a processing time. That is, the phase of each pixel can be obtained with ease in such a manner that the intensity value data g(x) of each pixel is fitted to the model equation of the interference fringe waveform, that is, g(x)=a(x)+b(x)cos$\{2\pi fx + \phi(x)\}$, in the vicinity of the pixel, so that an arithmetic formula becomes simple. Hence, it is possible to reduce an arithmetic process and to improve operating efficiency.

The present invention is not limited to the embodiment described above, but may be modified variously as follows.

(1) In the foregoing embodiment, the height of the target plane 30A is obtained through use of the intensity value data of the interference light-beam of one pixel in the vicinity of the pixel to be calculated. Alternatively, by utilizing two pixels in the vicinity of the pixel to be calculated, the height of the target plane 30A may be obtained from the three pixels in total.

In this case, three unknown variables can be obtained by solving three-dimensional simultaneous equations. In comparison with the case where the height is obtained through use of the intensity value data of the interference light-beam of one pixel in the vicinity of the pixel to be calculated, therefore, any one of the DC component a of the interference fringe waveform and the spatial frequency f of the interference fringe waveform can be added as an unknown variable.

As an example of estimating "f" by another method and adding "a" as an unknown variable, a height of a pixel to be calculated $x+\Delta x_1$ is obtained as the following equation (16) through use of plural pieces of intensity value data of interference light-beams in three pixels in total, that is, the pixel to be calculated $x+\Delta x_1$, a pixel $x+\Delta x_2$ in the vicinity of the pixel to be calculated and a pixel $x+\Delta x_3$ in the vicinity of the pixel to be calculated.

$$\tan\phi = \frac{(g_2 - g_1)\cdot\cos(x + \Delta x_3) + (g_1 - 2g_2 + g_3)\cdot\cos(x + \Delta x_2) + (g_3 - g_2)\cos(x + \Delta x_1)}{(g_2 - g_1)\cdot\sin(x + \Delta x_3) + (g_1 - 2g_2 + g_3)\cdot\sin(x + \Delta x_2) + (g_3 - g_2)\sin(x + \Delta x_1)} \quad (16)$$

Herein, $g_1$ is equal to $g(x+\Delta x_1)$, $g_2$ is equal to $g(x+\Delta x_2)$, and $g_3$ is equal to $g(x+\Delta x_3)$.

The arithmetic process described above makes it possible to precisely obtain a surface height of a predetermined pixel on the target plane 30A.

In the present invention, moreover, the height of the target plane 30A may be obtained through use of plural, for example, not less than four pixels in the vicinity of the relevant pixel. In this case, $\phi(x)$ is obtained based on information of plural pieces of intensity value data of a large number of pixels. Therefore, this configuration offers a feature capable of suppressing an influence of a measured value due to luminance noise at the time of taking an image and a quantization error at the time of calculation.

In the foregoing apparatus of the present embodiment, more specifically, the phase calculation part 25 of the CPU 20 obtains the phase to be obtained in the pixel x on the target plane 30A through use of a predetermined computational algorithm in order to obtain plural pieces of light-beam intensity value data of respective interference fringes of the relevant pixel x and plural (N) pixels $x+\Delta x_i$ (i=1, 2, 3, ..., N) (plural pixels existing in the x-axis direction in the present embodiment) in the vicinity of the relevant pixel x. Specifically, the intensity value data of the light-beam of the interference fringe in the pixel x to be calculated is obtained by the following equation (17).

$$g(x+\Delta x_i)=a(x+\Delta x_i)+b(x+\Delta x_i)\cos\{2\pi\cdot f\cdot(x+\Delta x_i)+\phi(x+\Delta x_i)\} \quad (17)$$

As in the foregoing embodiment, also in this case, the relational equations (3) to (5) are applied on the assumption that the DC components, the AC amplitudes and the phases of the interference fringe waveforms are respectively constant in the vicinity of the relevant pixel. In the case of the present embodiment, the following equations (18) to (20) are derived.

$$a(x_i)=a(x+\Delta x_i)=a \quad (18)$$

$$b(x_i)=b(x+\Delta x_i)=b \quad (19)$$

$$\phi(x_i)=\phi(x+\Delta x_i)=\phi \quad (20)$$

By the assumption as the forgoing equations (18) to (20), the equation (17) can be expressed as the following equation (21).

$$g(x+\Delta x_i)=a+b\cos\{2\pi\cdot f\cdot(x+\Delta x_i)+\phi\}=a+b\cos\phi\cdot\cos\{2\pi\cdot f\cdot(x+\Delta x_i)\}-b\sin\phi\cdot\sin\{2\pi\cdot f\cdot(x+\Delta x_i)\} \quad (21)$$

From the N-dimensional simultaneous equations, the DC component a, AC component b, spatial frequency f and phase $\phi$ of the interference fringe waveform are obtained from the estimation by the fitting. Herein, the DC component a of the interference fringe waveform and the spatial frequency f of the interference fringe waveform may be obtained by another method as in the case of calculating the phase $\phi$ from the two pixels or the three pixels.

In the following, description will be given of an example of estimating the spatial frequency f of the interference fringe waveform by another method and obtaining the DC component a of the interference fringe waveform from the estimation by the fitting.

From the equation (21), a set of (a, b cos $\phi$, b sin $\phi$) that satisfies the following equation (22) is obtained based on the plural pieces of intensity value data $g(x+\Delta x_i)$ of the plural pixels, and $\phi$ may be obtained from (b cos $\phi$, b sin $\phi$).

$$\min\sum_{i=1}^{N}\left[g(x+\Delta x_i) - \begin{bmatrix} a + b\cos\phi\cdot\cos\{2\pi\cdot f\cdot(x+\Delta x_i)\} - \\ b\sin\phi\cdot\sin\{2\pi\cdot f\cdot(x+\Delta x_i)\} \end{bmatrix}\right]^2 \quad (22)$$

Herein, the following equations (23), (24) and (25) are placed as follows.

$$A = \begin{bmatrix} 1 & \cos\{2\pi\cdot f\cdot(x+\Delta x_1)+\phi)\} & -\sin\{2\pi\cdot f\cdot(x+\Delta x_1)\} \\ 1 & \cos\{2\pi\cdot f\cdot(x+\Delta x_2)+\phi)\} & -\sin\{2\pi\cdot f\cdot(x+\Delta x_2)\} \\ \vdots & \vdots & \vdots \\ 1 & \cos\{2\pi\cdot f\cdot(x+\Delta x_N)+\phi)\} & -\sin\{2\pi\cdot f\cdot(x+\Delta x_N)\} \end{bmatrix} \quad (23)$$

$$G = \begin{bmatrix} g(x+\Delta x_1) \\ g(x+\Delta x_2) \\ \vdots \\ g(x+\Delta x_N) \end{bmatrix} \quad (24)$$

$$\alpha = \begin{bmatrix} a \\ b\cos\phi \\ b\sin\phi \end{bmatrix} \quad (25)$$

Next, $\alpha$ that satisfies the equation (22) can be obtained as the following equation (26).

$$\alpha=(A^T\cdot A)^{-1}\cdot A^T\cdot G \quad (26)$$

Then, the phase $\phi$ can be obtained from a vector component of $\alpha$ through use of the following equation (27).

$$\tan\phi = \frac{b\sin\phi}{b\cos\phi} \tag{27}$$

From the equation (27), φ can be obtained as in the equations (13) and (14) described in the foregoing embodiment.

As described above, a height of a pixel to be calculated can be obtained precisely even in the case of using plural pixels in the vicinity of the relevant pixel. It is to be noted that, in this modified embodiment, the plural pixels in the vicinity of the relevant pixel in the X-axis direction are used; however, pixels to be used herein are not particularly limited. For example, pixels in a Y-axis direction may be used.

(2) In the foregoing embodiment, the pixels to be used in the vicinity of the relevant pixel are distributed on one axis in the X-axis direction or the Y-axis direction. Alternatively, pixels to be used in the vicinity of the relevant pixel may be distributed on an X-Y plane. In this case, a pixel to be calculated on a (x, y) coordinate can be obtained with a coordinate of a pixel in the vicinity of the relevant pixel being defined as {(xi, yi)} (i=1, 2, ... N).

(3) In the foregoing embodiment, the image of the target object 30 is taken in a stationary state. Alternatively, the following configuration may be adopted. That is, a long target object or plural target objects 30 is/are moved at a predetermined speed and, simultaneously, an image of a target plane 30A is taken at a predetermined sampling time in synchronization with this moving speed, so that a surface height is obtained.

(4) In the foregoing embodiment, the CCD camera 19 is used as an image taking means. In light of a fact that only intensity value data of an interference fringe at a specific portion is detected, for example, an image taking means may be constituted of light receiving elements arranged in a one-dimensional array or in a two-dimensional array.

(5) In the foregoing embodiment, the surface height and surface profile of one target object 30 are obtained. However, the following configuration may be adopted. For example, plural target objects 30 are transported successively on a transport path or plural target objects 30 arranged in a line on a movable table are moved on an X-Y plane, so that surface heights and surface profiles of all the target objects 30 may be obtained.

(6) In the foregoing embodiment, the wavelength of the monochromatic light-beam outputted from the light source is determined in advance. Alternatively, the following configuration may be adopted. For example, plural band-pass filters are selectively provided so as to adjust a wavelength optionally.

(7) In the foregoing embodiment, the measurement is performed in such a manner that the angle of the reference plane 15 is set optionally with the parallelism of the target object 30 being kept in advance. Alternatively, the following configuration may be adopted. For example, a reference area which has a kept parallelism and has a known height is provided at a side of a measurement plane on a target object 30, the height of this area is measured in advance after setting of the angle of the reference plane 15, and a tilt of the target object 30 at this time is measured. Then, a correction amount of the obtained tilt is calculated, and correction may be made through use of a result of the calculation. Thus, it is possible to estimate a spatial frequency component of an interference fringe waveform.

INDUSTRIAL APPLICABILITY

As described above, the present invention is suitable for promptly and precisely measuring an uneven step difference on a surface of a target object.

The invention claimed is:

1. A surface profile measuring method for emitting a monochromatic light-beam outputted from a monochromatic light source onto a target plane and a reference plane through a dividing means to obtain a surface height and a surface profile of the target plane based on intensity value data of an interference fringe generated from the reflected light-beams which are reflected from both the target plane and the reference plane and, then, return on a single optical path, the surface profile measuring method comprising:
a first step of acquiring an image of the interference fringe generated in a state that the reference plane is arranged in a posture obliquely tilted at an angle relative to a traveling direction of the light-beam;
a second step of obtaining the intensity value data of the interference fringe in the acquired image for each pixel;
a third step of obtaining a phase of each pixel by a model equation expressing an interference fringe waveform, where intensity value data contain that of each pixel and those of plural pixels in the vicinity of the relevant pixel, on assumption that DC components, AC amplitudes and phases of the interference fringe waveforms are respectively constant in the vicinity of the relevant pixel;
a fourth step of obtaining the surface height of the target plane from the obtained phase of each pixel; and
a fifth step of obtaining the surface profile from the obtained surface height of the target plane;
wherein the phase is obtained in such a manner that the intensity value data g(x) of each pixel is fitted to an equation, g(x)=a +b cos {2πfx+Φ(x)}, which is the model equation of the interference fringe waveform, in the vicinity of the relevant pixel.

2. The surface profile measuring method according to claim 1, wherein
a spatial frequency component of the interference fringe waveform is set or estimated so as to be a predetermined value, and
signs of a sin φ component and a cos φ component in the obtained phase are obtained, so that a range of φ(x) in the model equation is specified based on a combination of sign information of the two components.

3. The surface profile measuring method according to claim 2, wherein in the model equation, φ(x) is expressed as follows:

φ=arc tan {S/C}+2nπ(n=a positive integer), in which S is equal to b sin φ and C is equal to b cos φ.

4. The surface profile measuring method according to claim 1, wherein
in the first step, the target object is moved, and the image of the target plane is acquired at a predetermined sampling time interval which is synchronized with a moving speed of the target object.

5. A surface profile measuring apparatus for emitting a monochromatic light-beam outputted from a monochromatic light source onto a target plane and a reference plane through a dividing means to obtain a surface height and a surface profile of the target plane based on intensity value data of an interference fringe generated from the reflected light-beams which are reflected from both the target plane and the reference plane and, then, return on a single optical path, the surface profile measuring apparatus comprising:

the reference plane being arranged in a posture obliquely tilted at an angle relative to a traveling direction of the light-beam, an image taking means takes the image of the target plane as the interference fringe generated from the reflected light-beams, which are reflected from the target object and the reference plane each irradiated with the monochromatic light-beam and, then, return on the single optical path;

a sampling means for capturing the taken image of the target plane, as the intensity value data of the interference fringe for each pixel of the image of the target plane;

a storing means for storing an interference fringe intensity value data group each of which is the intensity value data captured by the sampling means; and a calculating means for reading the intensity value data for each pixel from the intensity value data group stored in the storing means, utilizing the interference fringe waveform, where the intensity value data contain that of each pixel and those of the pixels in the vicinity of the relevant pixel, assuming that DC components, AC amplitudes and phases of the interference fringe waveforms are respectively constant in the vicinity of the relevant pixel, obtaining the phase of each pixel by a model equation expressing the interference fringe waveform, obtaining a surface height of the target plane from the obtained phase of each pixel, and obtaining a surface profile from the obtained surface height of the target plane;

wherein the calculating means obtains the intensity value data g(x) of each pixel in such a manner that the intensity value data g(x) of each pixel is fitted to an equation, $g(x)=a+b\cos\{2\pi fx+\Phi(x)\}$, which is the model equation of the interference fringe waveform, in the vicinity of the relevant pixel.

6. The surface profile measuring apparatus according to claim 5, wherein a wavelength of the monochromic light-beam outputted from the monochromic light source is determined in advance, and a spatial frequency component of the interference fringe waveform is set or estimated so as to be a predetermined value, the calculating means further includes a sign determination part for determining signs of a sin φ component and a cos φ component in the obtained phase, and a range of φ(x) in the model equation is specified based on a combination of sign information of the two components obtained by the sign determination part.

7. The surface profile measuring apparatus according to claim 6, wherein in the model equation, φ(x) is expressed as follows:

$$\phi = \arctan\{S/C\} + 2n\pi \ (n\text{=a positive integer}),$$

in which S is equal to b sin φ and C is equal to b cos φ.

8. The surface profile measuring apparatus according to claim 6, wherein the wavelength of the monochromatic light-beam outputted from the monochromatic light source is adjustable optionally.

\* \* \* \* \*